United States Patent [19]
Taylor et al.

[11] 4,413,218
[45] Nov. 1, 1983

[54] AUTOMATIC LOAD SEEKING CONTROL FOR A MULTITORQUE MOTOR

[75] Inventors: Noel R. Taylor; Paul A. Taylor, both of Odessa, Tex.

[73] Assignee: CMD Enterprise, Inc., Odessa, Tex.

[21] Appl. No.: 162,475

[22] Filed: Jun. 24, 1980

Related U.S. Application Data

[63] Continuation-in-part of Ser. No. 27,798, Apr. 6, 1979, Pat. No. 4,220,440, which is a continuation-in-part of Ser. No. 854,389, Nov. 23, 1977, abandoned.

[51] Int. Cl.³ .............................................. H02P 1/32
[52] U.S. Cl. .................................. 318/771; 318/778; 417/12; 417/45; 417/53
[58] Field of Search .................. 318/771, 778; 417/12, 417/45, 53

[56] References Cited

U.S. PATENT DOCUMENTS 2,709,775  5/1955  Del Carlo ........................... 318/771
3,624,471 11/1971  Japp et al. ........................... 318/771
4,220,440  9/1981  Taylor et al. ....................... 417/12

Primary Examiner—David Smith, Jr.
Attorney, Agent, or Firm—Marcus L. Bates

[57] ABSTRACT

Method and apparatus for matching the power output of a multitorque motor with the torque requirement of a connected load device. The stator windings of the motor are automatically connected in various different configurations to provide the optimum motor torque demanded by a connected load device which imposes varying load conditions on the motor. A novel control circuitry is connected between the motor starter and the motor stators. The control measures the power drawn by the motor stators and selects the most optimum configuration thereof which meets the changing torque requirements of the connected load device. This selection of optimum stator winding configurations commensurate with torque demand operates the motor in the lowest possible torque mode, which is considered the best electrical and mechanical operation of the motor and connected load device.

9 Claims, 8 Drawing Figures

AUTOMATIC LOAD SEEKING CONTROL FOR A MULTITORQUE MOTOR

This application is a continuation-in-part of Ser. No. 27,798, filed Apr. 6, 1979, now U.S. Pat. No. 4,220,440, which is a continuation-in-part of Ser. No. 854,389, filed Nov. 23, 1977, now abandoned.

BACKGROUND OF THE INVENTION

The industrial and commercial use of the three phase multitorque electric motor has an almost infinite number of applications. Among these applications of the three phase electric motor, there may be found many instances where the torque load requirements of the output shaft vary over a sustained period of time. Examples are cooling fans, pumpjack units, pipeline gathering systems and conveyor belts, where varying load requirements are encountered. The electric motors in these and other examples must be sized to accommodate the largest anticipated load requirement. Accordingly, many times during an operational period, only a fraction of the motor torque capability is required. During the period of time when less than the available torque is utilized, electric energy is wasted.

In recent years, energy in all forms is becoming progressively expensive and, perhaps, limited. Therefore, the time has arrived for new concepts of operation of the multitorque motor to be examined. One solution to some of the problems discussed above is the proper application of the multi-torque, three phase, constant voltage, electric motor.

These multi-torque motors have three field coils. Each of the three coils is comprised of dual windings so that nine leads exit from the motor, thereby enabling the windings to be connected in Y, Δ Y, or Δ configuration, respectively; thus providing a selection of low, medium, and high running torques, respectively.

Upon initial installation of the multitorque motor, a selection of the electrical connection of the nine electrical leads connected to the various windings must be mechanically effected at that time, and should it subsequently be desired to change the winding connections from Δ to Δ Y, for example, thereby reducing the available torque or power, it is necessary for the electrician to visit the electrical installation, break the old connections, and make the necessary changes. Should these changes from Δ to Δ Y subsequently prove to be more than adequate as a prime mover for the load requirement, the motor will run under unnecessarily high torque conditions. Moreover, there still remains the unused and more desirable low torque Y connection, which is the most desirable mode of operation when the load conditions permit this configuration.

Accordingly, anytime the motor torque mis-matches the requirements of the load, it is necessary to recognize the undesirable condition and to instruct an electrician to mechanically effect the required changes. This manual changing of the winding is impractical for the examples cited above, i.e., cooling fans, pumpjacks, pipeline gathering systems, and conveyor belts because of the numerous changes in the winding configuration which must be effected from time to time. Therefore, it is expected that the motor will not always be operating in its most efficient torque mode; and, in an extreme example, the motor often overheats and is shut down if severely overloaded.

Accordingly, it would be desirable to have made available a means by which the stator windings of a multi-torque motor is automatically connected in the configuration which provides the torque best suited for the particular load requirement. An automatic load seeking control, which continually provides this selection is the subject of the present invention.

SUMMARY OF THE INVENTION

This invention comprehends control circuitry for a multitorque motor having a power output shaft connected to a mechanical load which varies in torque requirements from time to time. Specifically, the present invention provides means by which the motor stator windings are automatically connected in Y, Δ Y, and Δ configuration in response to the change in magnitude of the average load imposed thereon over a sustained time interval.

This change in motor winding configuration occasioned by the changing demands of the connected mechanical load is obtained by a first contact means of the present invention which electrically connects the stator in Y configuration. This is the lowest torque mode possible of the three different available stator winding configurations. A first sensor means measures the current flow through the windings of the stator and disconnects the first contact means upon the current flow through the stator exceeding a first set or maximum average value during a sustained time interval. A second contact means immediately connects the stator windings in a Δ Y configuration upon said first contact means being disconnected in response to the action of the first sensor means.

Circuit means, including a first timer, disconnects the second contact means and reconnects the first contact means to again establish the Y configuration after a predetermined time interval has elapsed.

A third circuit means, including a third contact means and a second current sensor means, measures the current flow through the Δ Y connected stator and disconnects the second contact means while connecting the stator in Δ configuration upon the current flow through the Δ Y connected stator exceeding a second set value during another sustained time interval.

The circuit means of the present invention includes a second timer means which disconnects the third contact means and again connects the stator in the previous Δ Y configuration after a preselected time interval has expired.

Accordingly, during operation of the motor, the stator windings are connected in the most desirable configuration for the specific connected torque loads. Should the torque load increase, the motor current will increase, thereby causing the controller to select the next most desirable operational configuration which will result in the motor operation efficiently rather than overheating and shutting down, as would have otherwise occurred had the motor remained in the lower torque configuration.

Where the motor is connected in the Y configuration, for example, and the torque load increases, the controller changes to the Δ Y configuration. The Δ Y connected stator operates the connected load with the motor running at greater torque or power output. This condition is maintained for a preset period of time whereupon the motor is thereafter returned to its optimum mode of operation, which is the Y connected stator, assuming that the load is not further increased.

The motor again operates in this Y configuration until the load again increases, whereupon the motor is again connected in the Δ Y configuration.

On the other hand, after the motor has initially changed to the Δ Y, or the second mode of operation, should the power requirement of the connected torque load be of a value which is greater than the motor power output provided by the Δ Y configuration, the second current sensor means determines this overload condition for this particular configuration of the windings, and again the controller changes the connection of the stator to the Δ configuration. This action provides a high torque motor characteristic wherein the maximum power is delivered by the motor. The motor continues to operate in this mode for a preset time interval, whereupon the windings are thereafter returned to the Δ Y configuration for the before recited preset time interval, and thereafter the stator windings are returned to the low torque Y configuration as conditions change respective to the connected torque load requirements.

Therefore, the controller of this invention responds to the current load changes which occur over a period of time by automatically changing from one mode of operation to another in a manner which provides the most optimum motor operating characteristics, thereby providing power to the connected load in the most efficient manner respective to the available choice of stator winding configurations. This unusual operation of a multitorque motor improves the power factor of the electrical system, increases the operational efficiency, and reduces energy consumption.

Accordingly, a primary object of this invention is the provision of both method and apparatus for controlling the torque mode selection of a multitorque motor with respect to the torque load requirement of the motor output shaft.

Another object of the invention is to provide circuitry by which the stator windings of a multitorque motor are automatically changed between Y, Y Δ, and Δ in accordance with the operational load demands imposed on the motor shaft.

A further object of this invention is the provision of circuitry by which the stator windings of a multitorque motor are arranged respective to one another and to the source of electrical power to provide the most optimum motor operating characteristics.

A still further object of this invention is the provision of apparatus for controlling the operation of a multitorque motor having an output shaft connected to a varying load, with the motor characteristics being automatically changed through the use of thermally actuated switches and timing devices which are actuated in response to the electrical power flowing through the stator windings.

Another and still further object of this invention is the provision of a method of operating a multitorque motor, which is subjected to a variable torque load, and which includes connecting the stator in various different winding configurations to provide the optimum power output at the motor shaft.

A still further object of this invention is the provision of a method by which the internal wiring of a multitorque motor is selectively changed to automatically provide the most optimum power output thereof in response to a varying load requirement.

The above discussed objects are attained by measuring the current flow through selected parts of a motor during a sustained period of time and initiating a change in the motor connection when the current flow reaches a predetermined magnitude to thereby connect the motor windings in the most efficient configuration for a particular mode of operation.

The above objects are attained in accordance with the present invention by the provision of a method which can be carried out with apparatus fabricated in a manner substantially as described in the above abstract and summary.

These and various other objects and advantages of the invention will become readily apparent to those skilled in the art upon reading the following detailed description and claims and by referring to the accompanying drawings.

DETAILED DESCRIPTION OF THE PREFERRED EMBODIMENT

Figure 1:
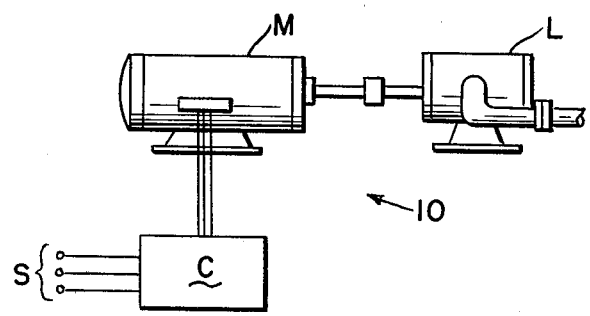
FIG. 1 is a diagrammatical view showing the combination of the present invention.

FIG. 1 diagrammatically illustrates the combination 10 of the present invention. The combination comprises a multitorque electric motor M; for example, a three phase 440 volt A.C. motor; which is connected by any suitable shaft means to a torque load L; for example, a fluid pump; and, a controller C which connects a suitable source of current S to the motor M in a particular manner. The controller is made in accordance with the present invention.

Figure 2:
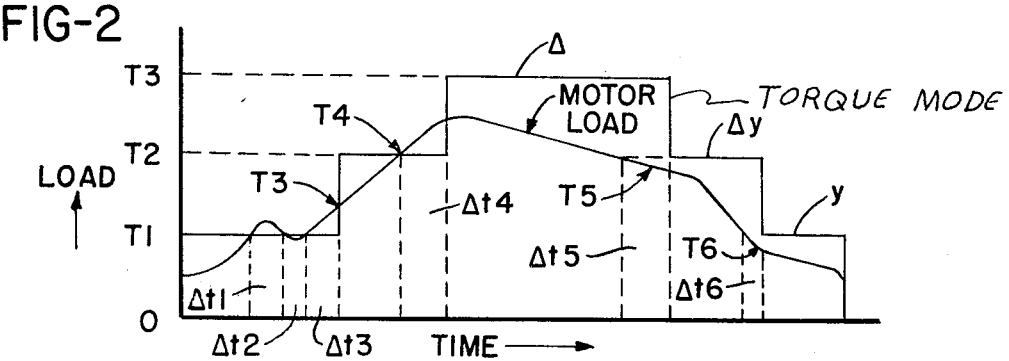
FIG. 2 is a plot of time vs load imposed on the motor of FIG. 1.

FIG. 2 discloses a plot showing the motor torque mode of motor M correlated with motor torque load L. For example, the motor load of FIG. 2 represents the torque required by the shaft motor in FIG. 1 for actuating the pump L.

In FIG. 2, the motor torque mode curve T1, T2, and T3; respectively; represents the torque ranges available when the motor stator windings are connected in Y, Δ Y, and Δ configuration, respectively. Δ t1 represents the time interval that the motor load exceeds T1, while Δ t2 represents the time interval that the motor consumed less power than was available in mode T1. Δ t3 represents the time interval and overload required for the motor winding configuration to change from Y to Δ Y. Δ t4 illustrates the time interval and overload required for the motor to change from Δ Y to Δ configuration. Δ t5 and Δ t6 similarly indicate the underload and time interval required to change from Δ to Δ Y and from Δ Y to Y winding configuration.

Figure 3:
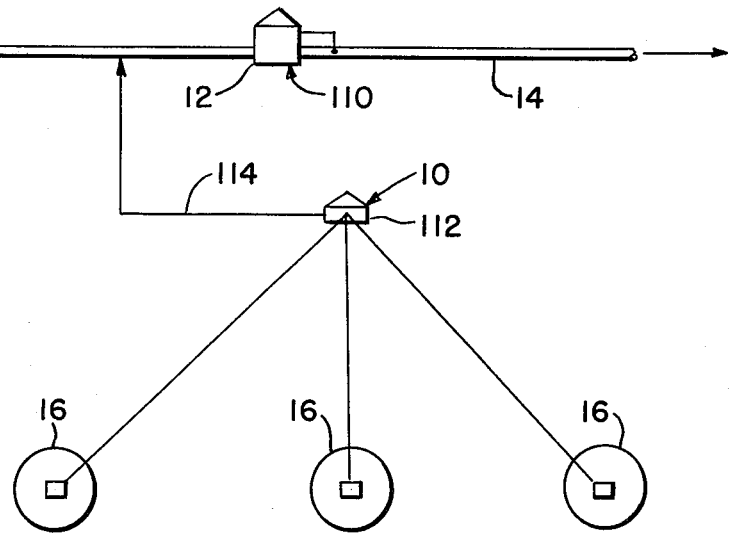
FIG. 3 schematically illustrates an embodiment of the present invention.

In FIG. 3, a pumping station 12 forces fluid to flow through a cross-country transmission line 14. A plurality of tank batteries 16 are flow connected to a pumping unit 112 having apparatus 10 contained therewithin. The flow continues to the pumping unit at 112 so that as fluid accumulates at 112, apparatus 10 transfers the fluid into the flow line 114.

The tank batteries at 16 operate intermittently so that at any particular time there may be no flow whatsoever, or all of the flow from all three of the tank batteries may be required to be transported into the cross-country transmission line, or the flow through the system 10 may be of a value which is between these two extremes.

Figure 4:
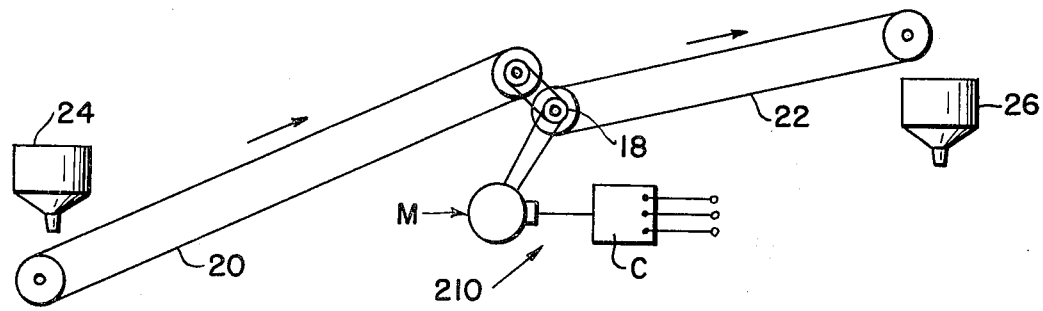
FIG. 4 schematically illustrates another embodiment of the present invention.

FIG. 4 illustrates a conveyor system having a motor and controller apparatus 210, made in accordance with the present invention, connected to means 18 which operatively imparts motion onto conveyor 20, which transfers the material onto conveyor 22, and then into hopper 26. The rate at which the hopper 24 deposits material onto conveyor 20 varies, and accordingly, the power requirement of the motor M changes from time to time in a manner similar to the illustration in FIG. 2, for example.

Figure 5:
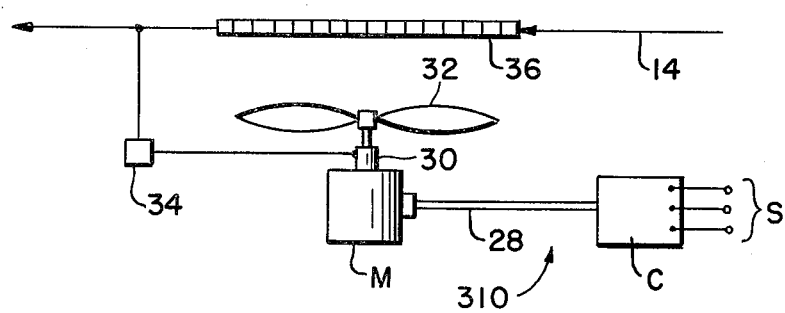
FIG. 5 schematically illustrates still another embodiment of the present invention.

FIG. 5 illustrates a motor M connected by electrical leads 28 to a controller C made in accordance with the present invention. A control means 30 is operatively connected to change the pitch of the blades of a propeller 32. Temperature sensing apparatus 34 is connected to flow line 14 and provides fluid pressure at 30 so that the propeller pitch is changed an amount which is proportional to the fluid pressure.

A radiator 36 is series connected respectively to flow line 14 so that as the motor rotatably drives the propeller, air is forced to flow through the radiator, thereby reducing the temperature of the fluid contained within conduit 14.

Figure 6:
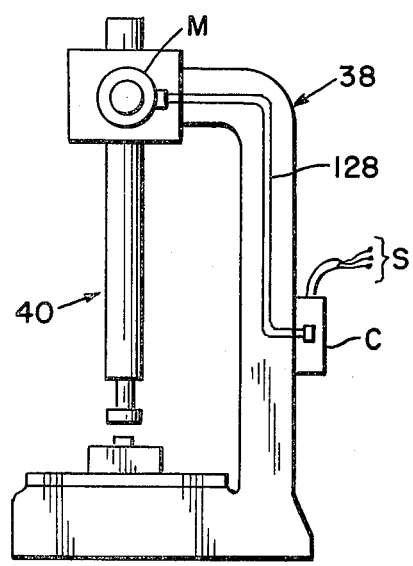
FIG. 6 schematically illustrates a further embodiment of the present invention.

FIG. 6 discloses a forging machine 38 having a reciprocating shaft member 40 which provides impact for a forging operation. Motor M is connected through a suitable gear box and reciprocates the shaft 40. Controller C, made in accordance with the present invention, is connected to a source S of current. The controller is connected at 128 for controlling the motor M.

Figure 7:
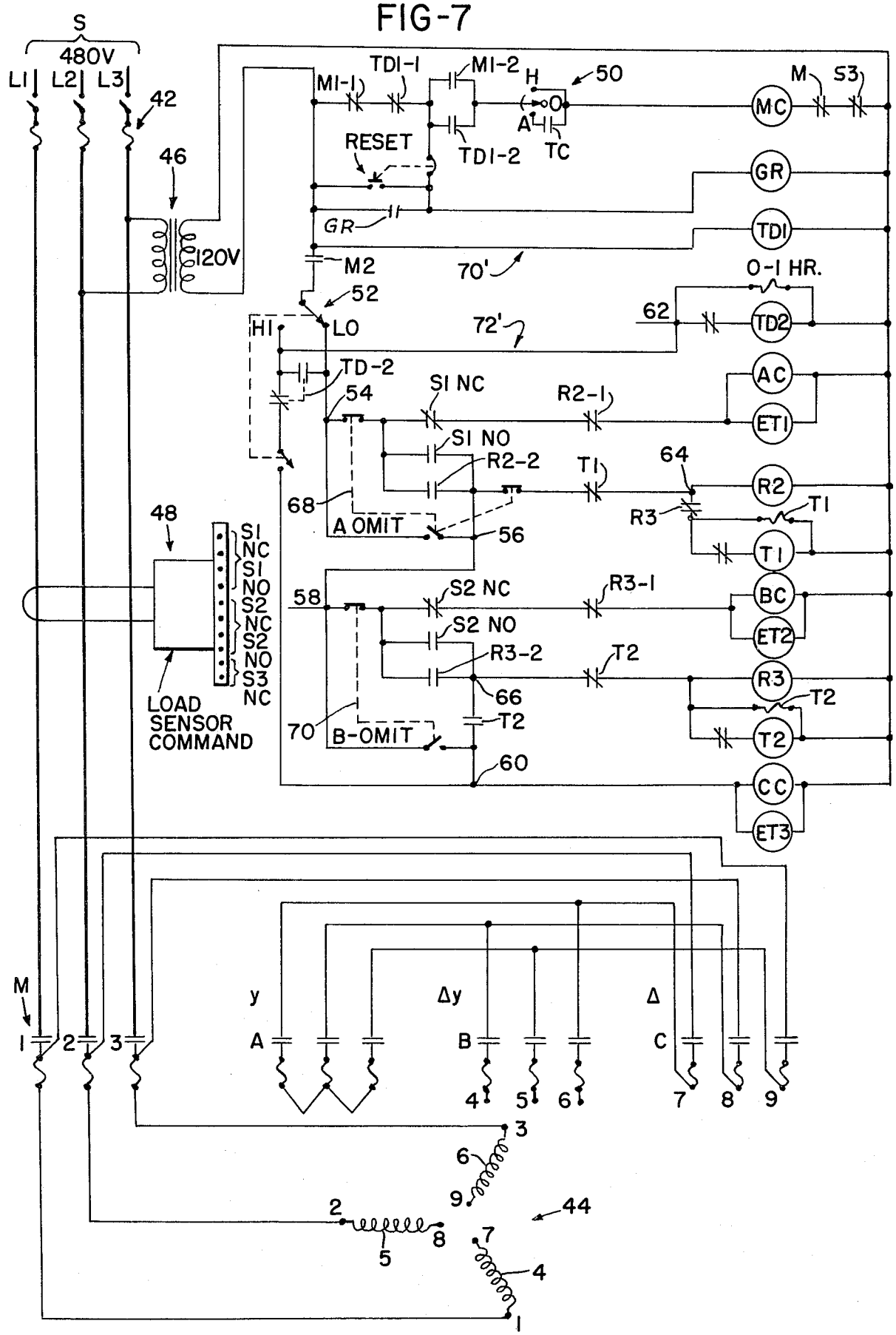
FIG. 7 is a schematical representation of the circuitry of the present invention; and, FIG. 8 is another schematical representation of the circuitry of the present invention.

FIG. 7 illustrates one form of the controller C. A source of current S is connected to switch assembly 42 for supplying current to the stator windings 44 and to the transformer 46 which in turn provides a current source for the illustrated pilot circuitry. A load sensor 48 measures the flow of current through the stator windings and actuates the illustrated contacts to the alternant position when the current load at 48 exceeds a predetermined value.

The stator windings 44 are provided with terminals 1-9. One side of each of the windings is connected to the current source by means of switch contactor M1. Switch contactor means at A, B, and C, respectively, contact the stator windings in Y, Δ Y, and Δ configuration, respectively, when one of the contactors A, B, or C is closed.

The apparatus is started in the low torque configuration by placing switch 50 in the A or automatic position, with the start mode switch 52 being in the low position, so that current flows through coil AC, thereby energizing contacts A which connects the stator in the Y configuration. The motor continues to run in the low torque configuration until it is de-energized, or until the motor is overloaded as seen at t3 in FIG. 2.

When the motor is overloaded to a value above T1 of FIG. 2, sensor 48 causes the S1 NC to open and the S1 NO to close, thereby de-energizing AC along with timer ET1, and energizing R2, T1, and BC. This action causes the A contacts to open and the B contacts to close, whereupon, the stator windings are connected in Δ Y configuration. The R2 coil closes contacts R2-2 and forms a holding circuit. Timer T1 commences to time out so that at the end of a predetermined time interval, generally 0–10 hours, coil T1 is de-energized and contacts T1 are opened which breaks the circuit through contacts R2-2, which in turn opens contacts B, closes R2-1, and again closes contacts A, thereby placing the stator windings back in the Y configuration or low torque mode.

Prior to timer T1 timing out, should the load sensor 48 detect an excessive current flow above T2 of FIG. 2 over a projected period of time Δ t4, the S2 normally closed switch will open while the S2 normally opened switch is concurrently closed, thereby de-energizing coil BC which causes the contacts B to open. At the same time, current flows through the S2 normally open switch (which is now closed), to junction 66, through T2 NC, which energizes R3 and T2, then through switch T2, to junction 60, thereby energizing coil CC and closing the C contacts which connect the stator windings in Δ configuration. Coil R3 closes contacts R3-2 to provide a holding circuit. Timer T2 commences to time out and after a preset time of 0–10 hours, coil T2 will be de-energized by its associate contacts, thereby opening contacts T2, and returning the circuitry to the Δ Y configuration.

When the circuitry is returned to the Δ Y configuration, timer T1 commences timing out and the hereinbefore described cycle of events continue with the control panel continuously monitoring the current flow and changing the winding configuration to provide the optimum motor torque range T1, T2, and T3 demanded by the connected load device.

On the other hand, while operating in the Δ configuration, should the sensor at 48 determine that an undue overload condition has occurred, the contacts at S3 will open, thereby de-energizing the coil MC which opens contacts M2 and shuts down the motor.

In normal operation the starting circuitry 70' of FIG. 7, which is of conventional design, functions to supply current to contactor M 1, 2, 3; and to switch 52 of the pilot circuitry 72', made in accordance with the invention.

When main line breaker 42 is closed, power is supplied to the transformer 46 which supplies power to coil MC through the M-1-1 NC, TD1 NC, thereby energizing the GR relay through contacts GR which seals in through GR4-3 contact. Simultaneously, power is supplied to timer TD1. Upon timing out, TD1-1 opens and TD1-2 closes; which supplies power through the HOA switch and to the MC coil to close the main contactor. Upon the MC contactor closing, M1-1, which is a mechanical operated switch, opens and M1-2 closes. This forms a parallel switch to TD1-2 to eliminate circuit "bounce" due to voltage dips.

At the same time, M2, also a mechanically operated switch, closes to provide a power source to the switch 52, the latter of which determines the start mode of the stator windings, as pointed out in greater detail in another part of this disclosure.

When the MC contactor closes, power is provided to terminals 1, 2, 3 of the multitorque motor, and if 52 is set in the low torque position, coil AC is energized to close the A contacts which places the motor stator windings in Y configuration.

It is sometimes desirable to start the motor in the high torque mode, and thereafter, let the control circuitry seek the most optimum winding configuration for the required torque values. The high torque mode start is achieved by placing switch 52 into the high start position.

The high start position bypasses coils AC and BC, energizes coil CC, and closes contacts C, thereby connecting the stator in Δ configuration. At the same time, timer TD2 commences timing out, and at the end of its timed cycle, TD2 closes the illustrated normally opened switch and opens the normally closed switch so that current flow is discontinued to coil CC and is established to coil AC, thereby placing the circuitry in the low torque mode.

It is sometime advantageous to omit the Y configuration and run the motor in either the Δ Y or Δ configuration. This is achieved by the A-omit switches which are tied together by the dot-dash line seen at 68. When the A-omit switch is moved to the alternant position, current flows from junction 54 to junction 56, 58, and to coil BC, thereby energizing contacts B and starting the motor in the Δ Y configuration.

At other times, it is desirable to eliminate the Δ Y winding configuration and operate the motor between Y and Δ. This is achieved by the B-omit switches indicated by numeral 70. When the B-omit switch is actuated to its alternant position, closure of S1 normally open provides current at 56, 58, and 60, thereby energizing the C contacts and placing the circuitry in the Δ configuration. Hence, the circuitry of FIG. 7 enables the motor to start in either of Y or Δ; and, to operate between any selected number or combination of the three torque modes.

Figure 8:
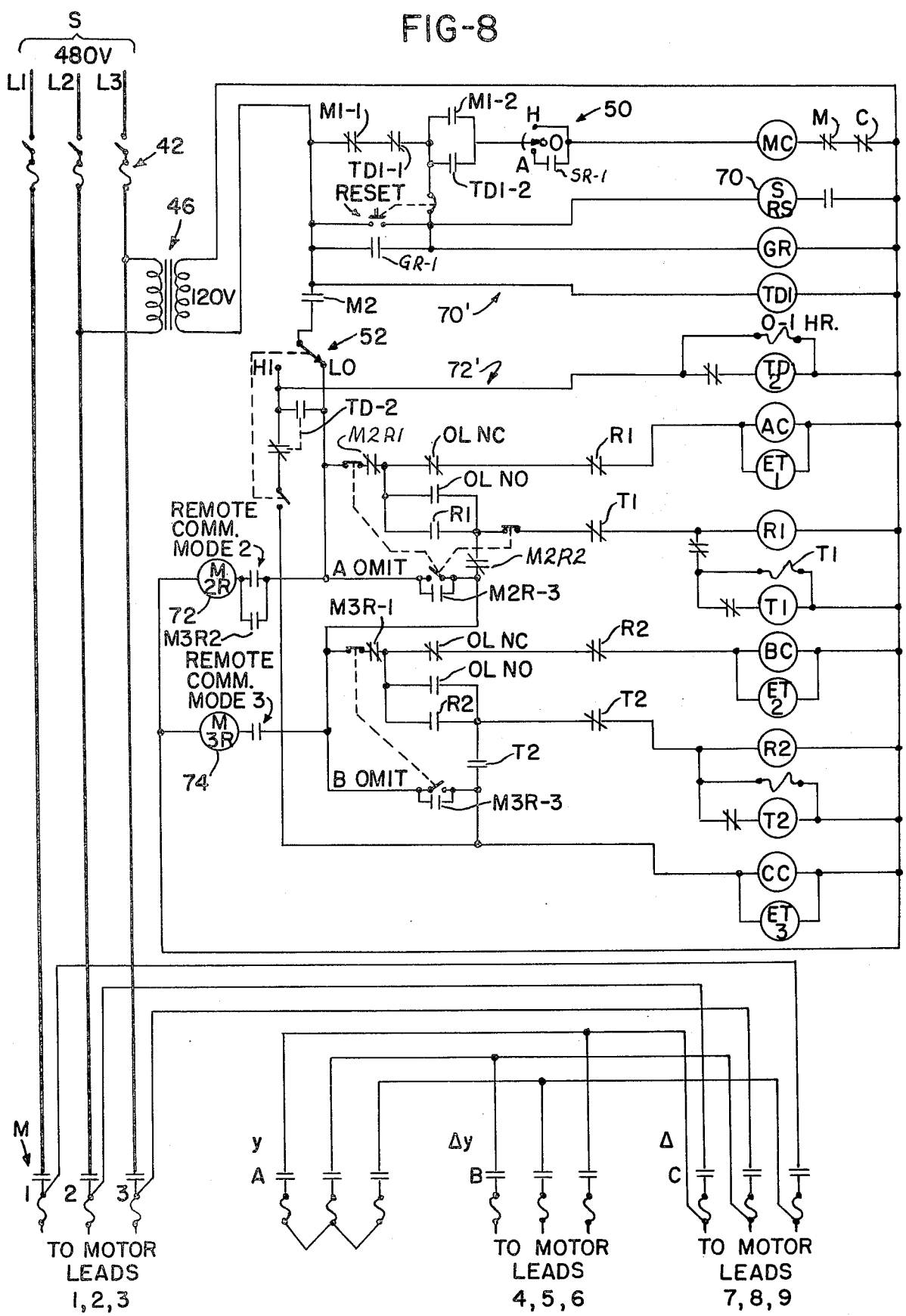

In FIG. 8, there is disclosed circuitry by which the motor is remotely controlled, thereby enabling a person to control the motor at a location distant from the apparatus. This is achieved by the addition of three common relays which are actuated individually by the coils seen at 70, 72, and 74. Coil 70 is a remote command start-stop switch assembly which energizes contacts M and M2 interlock, thereby enabling the circuitry to start in the selected torque mode.

Remote control coil 72 is energized whenever the apparatus is to be run in only the Δ Y and Δ configuration. The mode 2 relay 72 parallels the switches of the A-omit switch apparatus. The mode 2 relay breaks the circuit to the low torque holding coil, bypasses the sensing device, and closes the circuit to enable the unit to be in the Δ Y configuration. The circuitry cannot go back to the low torque Y configuration because the Y circuitry has been bypassed by the remote control. The circuitry can step up to the higher Δ configuration should an overload condition be sensed in the Δ Y configuration.

Coil means 74 is a remote command for mode 3, that is, the Δ configuration. Actuation of coil M3R actuates the switches M3R1, M3R2, and M3R3 to the alternant position. This omits operation in the Y and the Δ Y configurations as long as mode 3 relay 74 is energized, or alternatively, the motor is overloaded while in the Δ configuration, which would automatically actuate the overload and de-energize the motor.

Broadly, the present invention comprehends operation of a multitorque motor in one of a plurality of torque modes which is best suited for the load that is imposed on the motor. This includes starting the motor in any selected torque mode and thereafter operating between selected ones of the torque modes available which will provide the maximum efficiency of operation.

In FIG. 2, the motor load commences at a torque value below T1, which indicates the range of torque load available from the motor connected in Y configuration. As seen in FIG. 2, as the torque load increases, the optimum load for the Y configuration is exceeded during the time interval Δ t1. The motor controller remains in the Y configuration because the optimum limit has been exceeded only a small amount so the controller does not change to the medium torque configuration during this short interval of time which may represent 10 or 15 seconds of operation at 10% overload, for example. The motor load returns to its value below the T1 range for a time interval Δ t2 and then again increases to a value above T1 for time interval Δ t3. At t3 the Y connected motor has been overloaded sufficiently to cause the circuit to change from the Y to the Δ Y configuration. The power range available in this configuration is T1-T2. The motor continues to operate in the intermediate torque configuration until the torque load on the motor is again increased so that the motor draws excessive current for the Δ Y configuration during time interval Δ t4. This causes the motor controller to shift to the Δ or high torque mode at T3. This is the highest torque mode available and should the motor exceed the maximum torque T3 for a significant length of time and current flow, the motor will be shut down by the overload protector device.

In FIG. 2, however, the motor torque load is reduced and during time interval Δ t5, the motor current is below the Δ minimum current and falls within the intermediate torque mode. Accordingly, at T5 the controller times out the Δ configuration, places the stator into the intermediate torque configuration, where the motor continues to run until the timer times out at T6.

Had the motor not operated at reduced current during time interval Δ t6, the circuitry would have returned the winding configuration from Y back to Δ Y for another time interval. Hence, it is apparent that the motor controller steps up from one torque mode to another in response to current flow through the stator windings, and steps back down to a lower torque mode after a predetermined time interval.

FIGS. 3–6 illustrate various different applications of the motor and controller combination of the present invention. In FIG. 3, fluid is moving through pipeline 14 by a pumping apparatus 110 which comprises a multitorque motor and the controller of the present invention. The pump is required to maintain a minimum downstream pressure and accordingly, as the pressure changes in the flow line, the torque load imposed on the motor likewise changes. Therefore, the motor is advantageously operated in its most optimum torque mode in accordance with FIG. 2. This is achieved by employment of circuitry made in accordance with either of FIGS. 7 and 8.

In FIG. 3, there are three tank batteries 16 which gather crude oil from a plurality of oil wells. The crude flows to a central location 112 within which there is housed apparatus 10 made in accordance with the present invention. At times, there may be no flow to the pumping apparatus 10, at other times there may be intermediate flow, and at still other times a maximum of flow occurs from all three of the tank batteries. Under conditions of no flow, the pump motor at 112 is shut-in. When one of the three tank batteries commences delivering oil through the illustrated pipeline. the motor is started in the Y configuration and while operating should a second and third battery commence flow towards the pump 112, the motor controller will sense the increased load and change to either the intermediate or high torque mode, as may be required for efficiently handling the flow from 16 into the flow line 114.

Ideally, one of the tank batteries 16 is of a volumetric flow to cause the motor to operate near the upper range of the Y configuration, two of the tank batteries supply a volumetric flow which necessitates the motor operating efficiently in the upper portion of the intermediate torque range, while the volumetric flow of all three tank batteries requires the motor to operate in the upper limits of its Δ or high torque range.

In FIG. 4, a conveyor system transports a load from 24 to 26. As the load on the conveyor system increases and decreases, the torque load required by the motor changes proportionally. Accordingly, the controller of the present invention selects the most optimum torque mode for the stator winding configuration so that optimum efficiency is realized from the motor, in accordance with FIG. 2 of the drawings.

In FIG. 5, a cross-country gas transmission line 14 is provided with a regulator 36 downstream of the compressor station 110 illustrated in FIG. 3. As the gas is compressed, the temperature thereof is elevated, and accordingly, friction flow is excessive. Therefore, the illustrated radiator 36 must cool the gas to an acceptable value so that it can more economically be forced through the cross-country transmission line. A multitorque three-phase motor is connected to a variable pitch propeller 32, with the propeller pitch being varied at 30 and 34 so that the temperature downstream of the radiator is maintained within an acceptable range. The present invention enables the motor size to be selected such that it can handle the largest anticipated load when connected in the Δ configuration. This invariably would be a hot summer day when the ambient temperature is at a maximum.

But during the night, and especially during the winter nights, very little cooling by the heat exchanger 36 is required. Accordingly, during this time, it is advantageous to be able to connect the motor in the most optimum torque mode for the minimum load condition.

Therefore, the apparatus of FIG. 5 enables the motor to always be connected in its most optimum torque mode as the propeller pitch changes in response to the downstream temperature of the flowing gases.

FIG. 6 discloses a forging machine which is subjected to extremely hard work for part of the day, and then is subjected to relatively light work loads for another portion of the day. A multitorque motor M connected to a controller system made in accordance with the present invention enables the most appropriate and efficient torque mode of the motor to be selected so that the motor size can be closely correlated with the anticipated work to be produced by the forging machine.

In FIGS. 7 and 8 the following conventional symbols are more fully defined:

M, NC: a contactor switch which is actuated by coil MC

TD1, NC: a contactor switch which is actuated by TD1

M, NO: a contactor switch which is actuated by coil MC

TD1, NO: a contactor switch which is actuated by TD1

MC: a coil which actuates, M, M1, M2 to the alternant position

M O/L: an overload device for current flow at M, the main contact

S3 O/L: an overload device actuated by S3 NC

GR: a coil which actuates switch GR NO to the closed position and is deenergized in response to excessive temperature in the motor winding.

TD1: a timing device which actuates TD1, NC; TD1, NO; to the alternant position.

M2: an auxiliary contact switch which is operated mechanically by the closing of MC contactor device ET 1, 2, 3: lapse time recorders which log the accumulated time interval that the motor is operated in each of the three torque modes during the year ip: an inherent protector device.

The load sensor command 48 comprises means for measuring current flow to the motor and actuating the illustrated switches S 1, 2, 3 to the alternant position in response to the current flow through the stator exceeding a predetermined value over a finite time interval. One load sensor device which accomplishes this purpose and is commercially available is a thermally responsive switch which is actuated in response to current flow to M 1, 2, 3, as is pointed out in greater detail in our copending patent application Ser. No. 027,798 filed Apr. 6, 1979 and Ser. No. 854,389 filed Nov. 23, 1977, now abandoned.

Whenever the motor is overloaded and the sensor command shifts the circuitry to the next higher torque mode, that is, whenever the average motor current exceeds a predetermined value for a specific time interval, it is advantageous to continue operation in the higher torque mode for 20–40 minutes following a reduction in the power consumption which initially caused the overload, so as to enable the motor components to attain a lower equilibrium temperature while the stator is in the higher torque mode and before returning to the lower torque mode. This may be achieved by the timer device T1 and T2 which serves the dual purpose of providing a time lapse during which the higher torque requirements are removed, as well as using any remaining time provided by the timer device for motor cooling.

Hence, the timers are set according to the history of operation of the motor and equipment. For example, if it is known that the heat exchanger 36 in FIG. 5 is moderately hot for four hours of the day and very hot for three hours of the day, the timer T2 is set for 3.5 hours and the timer T1 is set for 4.5 hour, thereby providing an extra few minutes of operation in the high torque range as the circuitry steps down from Δ to Δ Y to Y configuration.

We claim:

1. In a conveyor apparatus which conveys material from one location to another, wherein the mass of the conveyed material varies from one to another time interval, a three phase motor connected to move said conveyor, said motor having an automatic load seeking control circuitry for changing the stator winding of the motor from a high speed, high torque to a low speed, low torque configuration, comprising:

a motor starter means for connecting each stator winding to a source of current;

circuit means, including a first conductor means, for connecting the stator windings into a Y configuration;

sensor means responsive to a predetermined maximum average current flow which is actuated after said average current flow has occurred during a first time interval;

circuit means, including a second conductor means for connecting the stator windings into a Δ configuration when said second conductor means is energized;

means by which said sensor means, when actuated, deenergizes said first conductor means and thereafter energizes said second conductor means;

a timer device connected to cause said second conductor means to be de-energized and said first conductor means to be energized a finite interval of time following energization of said second conductor means;

said starter means includes circuit means by which said stator windings are selectively connected in one of said Y and Δ configuration to thereby enable the motor to start in either a high torque or a low torque mode;

so that the motor can be started in Y or Δ configuration, and thereafter, said first and second conductor means will automatically change the winding configuration to either a high speed, high torque or low speed, low torque configuration depending upon the load imposed upon the motor.

2. In a prime mover apparatus having a multitorque motor which is connected to a mechanical load which varies in torque requirements from one time interval to another time interval, said motor having a stator connectable in either of Y, Δ Y, and Δ configuration, the improvement comprising:

first circuit means for connecting the stator in Y configuration when said first circuit means is energized; said first circuit means includes a first sensor means for determining the current flow through said Y connected stators and for disconnecting said Y connected stator when the current flow through said Y connected stator exceeds a first maximum value during a first time interval;

second circuit means for connecting the stator in Δ Y configuration when said first circuit means is disconnected by said first sensor means;

said second circuit means includes a first timer means by which said second circuit means disconnects said Δ Y configuration after a predetermined time interval has expired, and said first circuit means concurrently connects said stator in the Y configuration;

third circuit means and a second sensor means, said second sensor means measures the current flow through said Δ Y connected stators and causes said second circuit means to disconnect said Δ Y configuration while concurrently causing said third circuirt means to connect said stators in Δ configuration when the average current flow through said Δ Y stators exceeds a second maximum value;

said third circuit means further includes a second timer by which current flow to the Δ connected stator is discontinued by said third circuit means, while said second circuit means concurrently connects the stator in Δ Y configuration after a preselected time interval has expired;

means providing current flow to said first, second, and third circuit means so that said stator can be connected to a suitable current supply; and starter means including a starting mode circuit by which said stators of said motor are selectively connected in either of Y and Δ configuration so that the motor starts in either of a low or high torque configuration and thereafter seeks to connect the stator in one of Y, Y Δ, and Δ winding configuration in accordance with the load imposed upon the motor;

said mechanical load is a variable pitch propeller connected to be driven by the output shaft of the motor; a heat exchanger connected to exchange heat energy between fluid flowing therethrough and ambient air, means mounting said propeller to force ambient air across said heat exchanger in proportion to the propeller pitch, means measuring the temperature of the fluid flowing through the radiator and changing the propeller pitch in proportion to the magnitude of the measured temperature;

so that as the temperature of the fluid increases, the mass flow of ambient air changes proportionally, which causes the motor stator windings to be connected in the most optimum configuration for the torque load of the propeller.

3. In a prime mover apparatus having a multitorque motor which is connected to a mechanical load which varies in torque requirements from one time interval to another time interval, said motor having a stator connectable in either of Y, Δ Y, and Δ configuration, the improvement comprising:

first circuit means for connecting the stator in Y configuration when said first circuit means is energized; said first circuit means includes a first sensor means for determining the current flow through said Y connected stators and for disconnecting said Y connected stator when the current flow through said Y connected stator exceeds a first maximum value during a first time interval;

second circuit means for connecting the stator in Δ Y configuration when said first circuit means is disconnected by said first sensor means;

said second circuit means includes a first timer means by which said second circuit means disconnects said Δ Y configuration after a predetermined time interval has expired, and said first circuit means concurrently connects said stator in the Y configuration;

third circuit means and a second sensor means, said second sensor means measures the current flow through said Δ Y connected stators and causes said second circuit means to disconnect said Δ Y configuration while concurrently causing said third circuit means to connect said stators in Δ configuration when the average current flow through said Δ Y stators exceeds a second maximum value;

said third circuit means further includes a second timer by which current flow to the Δ connected stator is discontinued by said third circuit means, while said second circuit means concurrently connects the stator in Δ Y configuration after a preselected time interval has expired;

means providing current flow to said first, second, and third circuit means so that said stator can be connected to a suitable current supply; and starter means including a starting mode circuit by which said stators of said motor are selectively connected in either of Y and Δ configuration so that the motor starts in either of a low or high torque configuration and thereafter seeks to connect the stator in one of Y, YΔ, and Δ winding configuration in accordance with the load imposed upon the motor;

said mechanical load is a conveyor means, said motor has an output shaft connected to drive the conveyor means, so that as the material being transported by the conveyor means changes in weight, the motor stator winding configuration changes to provide the most optimum torque mode.

4. In a prime mover apparatus having a multitorque motor which is connected to a mechanical load which varies in torque requirements from one time interval to another time interval, said motor having a stator connectable in either of Y, Δ Y, and Δ configuration, the improvement comprising:

first circuit means for connecting the stator in Y configuration when said first circuit means is energized; said first circuit means includes a first sensor means for determining the current flow through said Y connected stators and for disconnecting said Y connected stator when the current flow through said Y connected stator exceeds a first maximum value during a first time interval;

second circuit means for connecting the stator in Δ Y configuration when said first circuit means is disconnected by said first sensor means;

said second circuit means includes a first timer means by which said second circuit means disconnects said Δ Y configuration after a predetermined time interval has expired, and said first circuit means concurrently connects said stator in the Y configuration;

third circuit means and a second sensor means, said second sensor means measures the current flow through said Δ Y connected stators and causes said second circuit means to disconnect said Δ Y configuration while concurrently causing said third circuit means to connect said stators in Δ configuration when the average current flow through said Δ Y stators exceeds a second maximum value;

said third circuit means further includes a second timer by which current flow to the Δ connected stator is discontinued by said third circuit means, while said second circuit means concurrently connects the stator in Δ Y configuration after a preselected time interval has expired;

means providing current flow to said first, second, and third circuit means so that said stator can be connected to a suitable current supply; and starter means including a starting mode circuit by which said stators of said motor are selectively connected in either of Y and Δ configuration so that the motor starts in either of a low or high torque configuration and thereafter seeks to connect the stator in one of Y, Y Δ, and Δ winding configuration in accordance with the load imposed upon the motor;

said first sensor means and said second sensor means are each thermally actuated switch means which are actuated when the current flow through the stator generates sufficient heat to actuate said thermally actuated switch means; the inherent time delay of said thermally actuated switch means provides said first time interval.

5. A load seeking control device for a multiphase electric motor which is subjected to a varying load condition of first, second, and third magnitudes, respectively, during time intervals of 1, 2, and 3, respectively; means by which the stators of said motor can be connected in either of Y, Δ Y, and Δ configuration, respectively, to provide a low, medium, and high torque, respectively.

a starter means for starting said motor; first circuit means by which said motor is connected in Y configuration;

second circuit means, including a first current flow sensor, by which said motor is connected in Δ Y when the average current flow to the Y connected motor exceeds the current rating of the Y connected stator over a first time interval;

a second current flow sensor by which said motor is connected in Δ when the average current flow to the motor exceeds the current rating of the Y Δ connected stator over another time interval;

said starter means includes a starting mode circuit by which said stators of said motor are selectively connected in either of Y and Δ configuration so that the motor starts in either of a low or high torque configuration and thereafter seeks to connect the stator in one of Y, Y Δ, and Δ winding configuration in accordance with the load imposed upon the motor;

circuit means, including a first timer, by which said motor is changed from Y Δ to Y should the average current flow assume a value below said current rating of said Y Δ connected stator;

circuit means, including a timer, by which said motor is changed from Δ to Y Δ should the current flow assume a value below said current rating of said Δ connected stator;

whereby said motor operates in Y, Δ Y, or Δ configuration according to the power output of the motor;

said varying load is a variable pitch propeller, means by which said propeller is connected to the output shaft of the motor; a heat exchanger connected to exchange heat energy between fluid flowing therethrough and ambient air, means mounting said propeller to force ambient air across said heat exchanger in proportion to the propeller pitch, means measuring the temperature of the fluid flowing through the radiator and changing the propeller pitch proportional to the measured temperature;

so that as the temperature of the fluid increases, the mass flow of ambient air changes proportionally, which causes the motor stator windings to be connected in the most optimum configuration for the torque load of the propeller.

6. A load seeking control device for a multiphase electric motor which is subjected to a varying load condition of first, second, and third magnitudes, respectively, during time intervals of 1, 2, and 3, respectively; means by which the stators of said motor can be connected in either of Y, Δ Y, and Δ configuration, respectively, to provide a low, medium, and high torque, respectively;

a starter means for starting said motor; first circuit means by which said motor is connected in Y configuration;

second circuit means, including a first current flow sensor, by which said motor is connected in Δ Y when the average current flow to the Y connected motor exceeds the current rating of the Y connected stator over a first time interval;

a second current flow sensor by which said motor is connected in Δ when the average current flow to the motor exceeds the current rating of the Y Δ connected stator over another time interval;

said starter means includes a starting mode circuit by which said stators of said motor are selectively connected in either of Y and Δ configuration so that the motor starts in either of a low or high torque configuration and thereafter seeks to connect the stator in one of Y, Y Δ, and Δ winding configuration in accordance with the load imposed upon the motor;

circuit means, including a first timer, by which said motor is changed from Y Δ to Y should the average current flow assume a value below said current rating of said Y Δ connected stator;

circuit means, including a timer, by which said motor is changed from Δ to Y Δ should the current flow assume a value below said current rating of said Δ connected stator;

whereby said motor operation in Y, Δ Y, or Δ configuration according to the power output of the motor;

said varying load is a conveyor means, said motor has an output shaft connected to drive the conveyor means, so that as the material being transported by the conveyor means changes in weight, the motor stator winding configuration changes to provide the most optimum torque mode.

7. Method of operating a mechanical device which is powered by a three phase motor, and wherein a variable mechanical load is imposed upon the motor by the mechanical device, comprising the following steps:

(1) connecting the stator windings of the motor in a Y configuration by connecting each of the stator windings to a set of contacts and connecting the contacts to a source of current such that the current flows through each winding and to a common junction;

(2) connecting each of the stator windings of the motor in a Δ configuration by attaching one side of each stator winding to a set of contacts and connecting the contacts to a source of current such that the current flows in Δ configuration through the windings;

(2a) determining the starting torque mode required to accommodate said variable mechanical load, and selecting one of the torque modes of steps (1) and (2) which most nearly matches the mechanical load;

(3) starting the motor by connecting the stator windings as set forth in step (2a); and thereafter;

(4) measuring the current flow through the stator windings; the thereafter, (5) opening the contacts of step (1) and closing the contacts of step (2) when the motor is connected in the configuration of step (1) and the current in step (4) exceeds a predetermined average value;

(6) simultaneously commencing a timer with the closing of the contacts of step (2); and, (7) using the timer to open the contacts of step (2) and close the contacts of step (1) after a set time has lapsed;

(8) connecting the output shaft of the motor to power a conveyor means which transports a mass from one location to another, so that as the mass changes in weight, the motor stator is connected in the appropriate torque mode for efficiently moving the mass by the conveyor.

8. Method of operating a mechanical device which is powered by a three phase motor, and wherein a variable mechanical load is imposed upon the motor by the mechanical device, comprising the following steps:

(1) connecting the stator windings of the motor in a Y configuration by connecting each of the stator windings to a set of contacts and connecting the contact to a source of current such that the current flows through each winding and to a common junction;

(2) connecting each of the stator windings of the motor in a Δ configuration by attaching one side of each stator winding to a set of contacts and connecting the contacts to a source of current such that the current flows in Δ configuration through the windings;

(2a) determining the starting torque mode required to accommodate said variable mechanical load, and selecting one of the torque modes of steps (1) and (2) which most nearly matches the mechanical load;

(3) starting the motor by connecting the stator windings as set forth in step (2a); and thereafter;

(4) measuring the current flow through the stator windings; and thereafter, (5) opening the contacts of step (1) and closing the contacts of step (2) when the motor is connected in the configuration of step (1) and the current in step (4) exceeds a predetermined average value;

(6) simultaneously commencing a timer with the closing of the contacts of step (2);

(7) using the timer to open the contacts of step (2) and close the contacts of step (1) after a set time has lapsed;

(8) connecting the output shaft of the motor to rotate a variable pitch propeller;

(9) changing the propeller pitch from one time interval to another time interval;

whereupon said controller connects the motor stator windings in the most optimum torque mode to supply the varying power requirements of the propeller.

9. A load seeking control device for a multiphase electric motor which is subjected to a varying load condition of first, second, and third magnitudes, respectively, during time intervals of 1, 2, and 3, respectively; means by which the stators of said motor can be connected in either of Y, Δ Y, and Δ configuration, respectively, to provide a low, medium, and high torque, respectively;

a starter means for starting said motor; first circuit means by which said motor is connected in Y configuration;

second circuit means, including a first current flow sensor, by which said motor is connected in Δ Y when the average current flow to the Y connected motor exceeds the current rating of the Y connected stator over a first time interval;

a second current flow sensor by which said motor is connected in Δ when the average current flow to the motor exceeds the current rating of the Y Δ connected stator over another time interval;

said starter means including a starting mode circuit by which said stators of said motor are selectively connected in either of Y and Δ configuration so that the motor starts in either of a low or high torque configuration and thereafter seeks to connect the stator in one of Y, Y Δ, and Δ winding configuration in accordance with the load imposed upon the motor;

circuit means, including a first timer, by which said motor is changed from Y Δ to Y should the average current flow assume a value below said current rating of said Y Δ connected stator;

circuit means, including a timer, by which said motor is changed from Δ to Y Δ should the current flow assume a value below said current rating of said Δ connected stator;

whereby said motor operates in Y, Δ Y, or Δ configuration according to the power output of the motor;

said load is a variable pitch propeller which forces one fluid to flow in heat exchange relationship to another fluid; means by which the pitch of said propeller is changed in proportion to the temperatures of said second fluid; the variation in the mass flow of said one fluid being the recited variation in the mechanical load;

said first, second, and third circuit means, respectively, changes the stator to the Y, Δ Y, and Δ configuration, respectively, to cause the current flow through the motor to be equal to the rated motor output for Y, Δ Y, and Δ configuration.

* * * * *